June 1, 1965   A. W. HARRISON   3,186,517
CALIPER TYPE DISC BRAKES
Filed Aug. 30, 1963   4 Sheets-Sheet 3
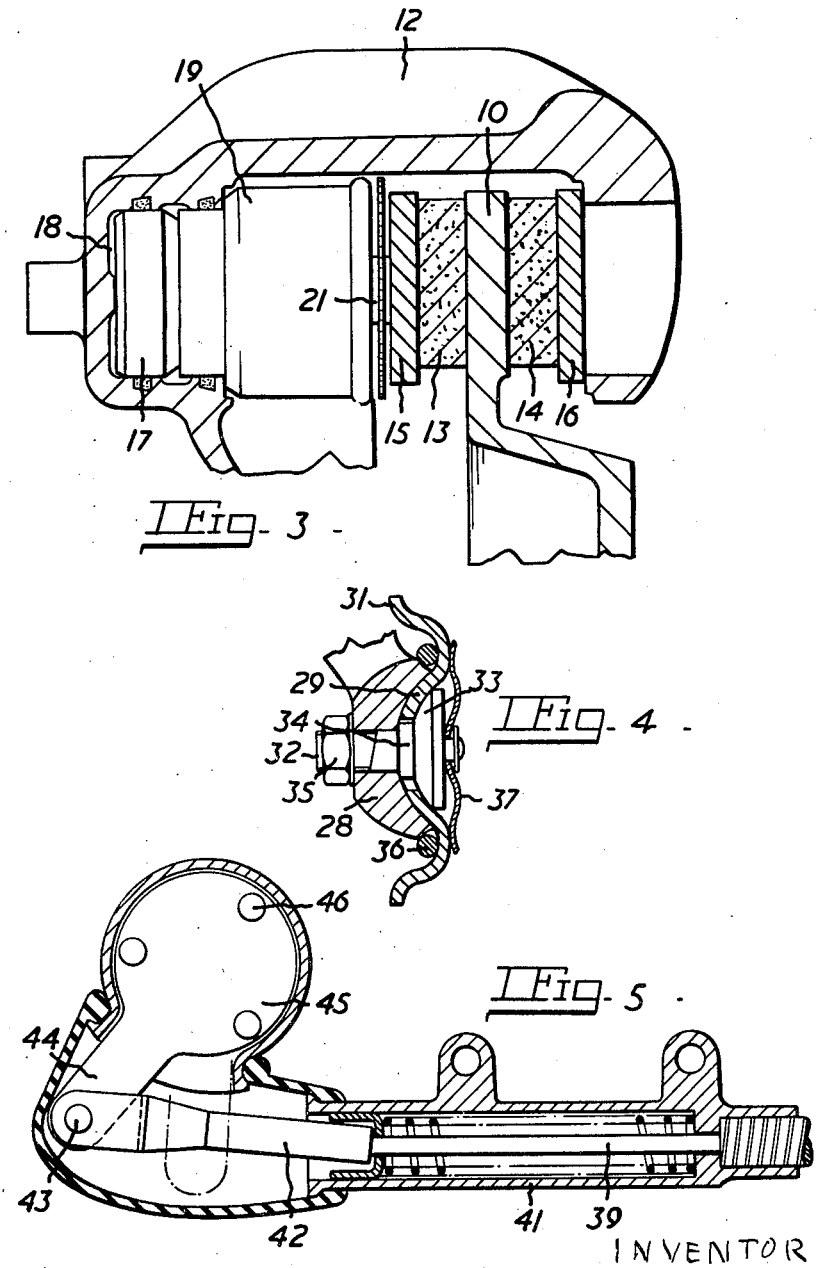

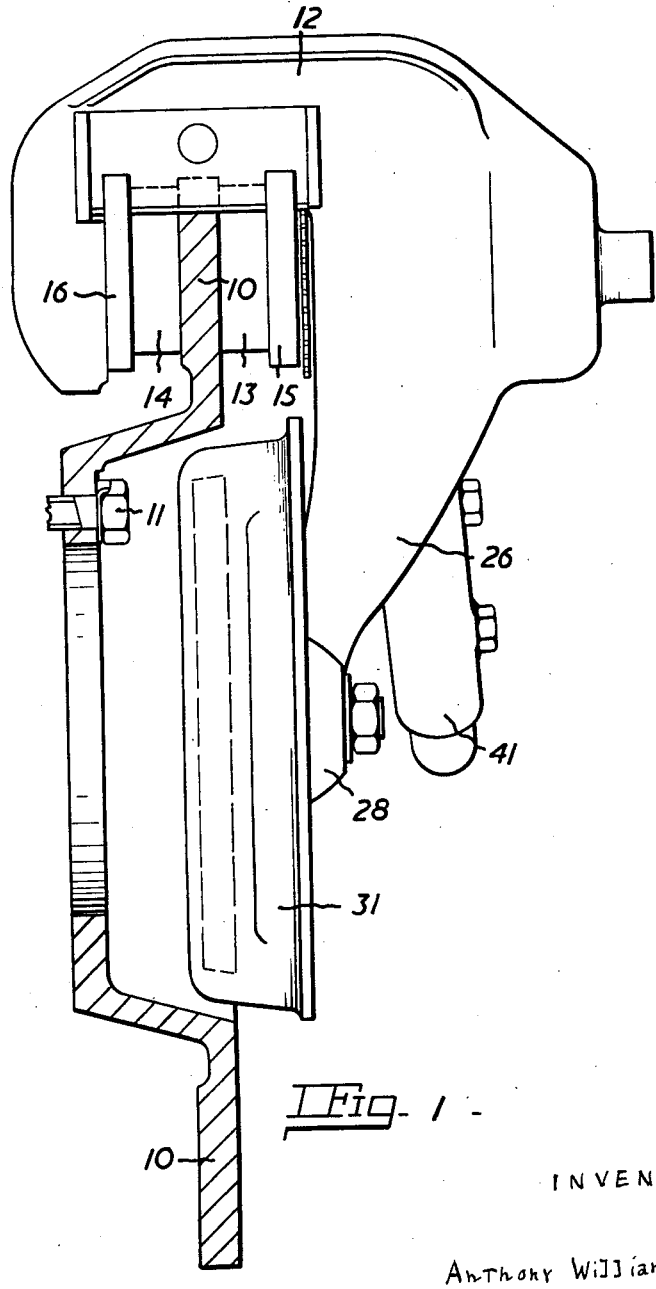

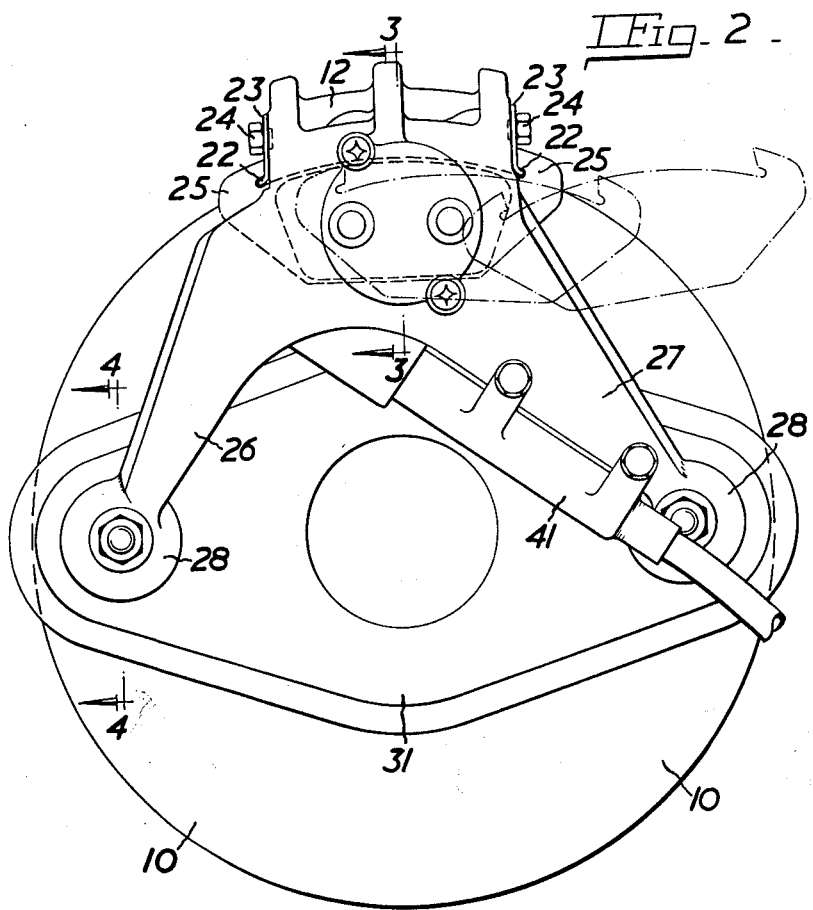

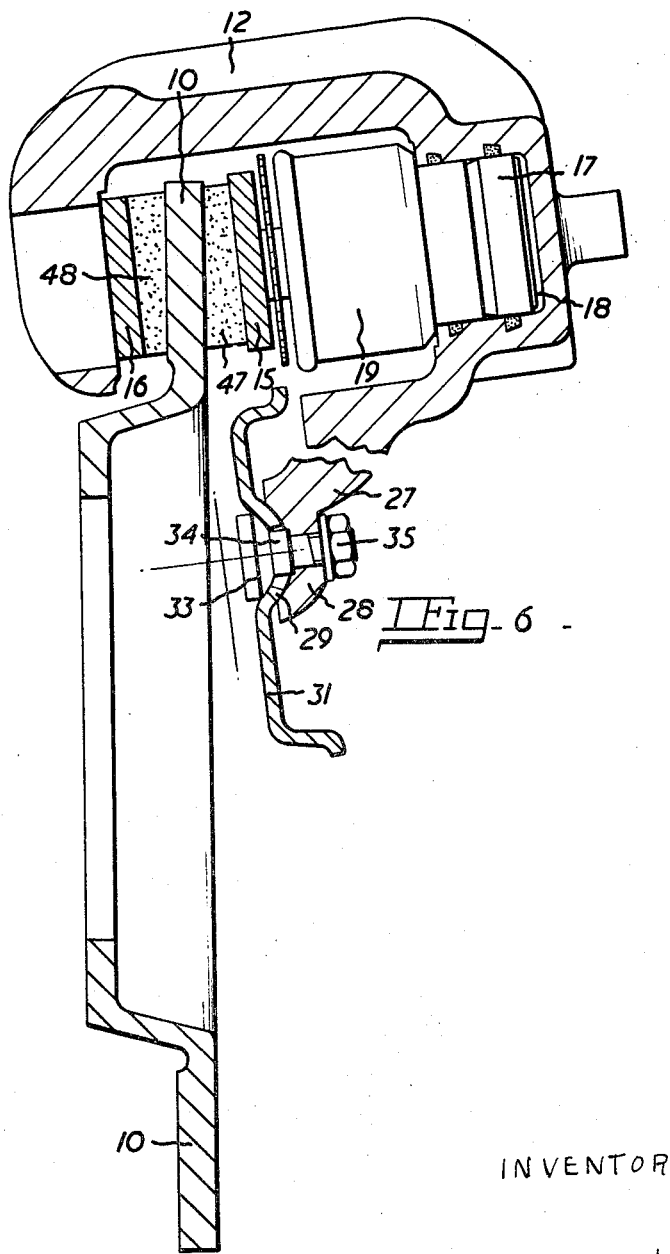

United States Patent Office 3,186,517
Patented June 1, 1965

3,186,517
CALIPER TYPE DISC BRAKES
Anthony William Harrison, Birmingham, England, assignor to Girling Limited, Birmingham, England, a British company
Filed Aug. 30, 1963, Ser. No. 305,674
Claims priority, application Great Britain, Sept. 1, 1962, 33,646/62
3 Claims. (Cl. 188—73)

This invention relates to improvements in disc brakes of the kind in which friction pads adapted to engage opposite faces of a rotatable disc or ring are located in or on a caliper which straddles a portion of the periphery of the disc or ring and one friction pad is applied to the disc by actuating means mounted in or on the caliper while the other is applied by the reaction on the caliper which is angularly movable about an axis substantially at right angles to the axis of the disc.

One of the objects of our invention is to provide a brake of this kind in which the mounting of the caliper is so arranged that there is a minimum radial movement of the friction pads relative to the disc as the pads wear.

According to our invention, in a disc brake of the kind set forth, the caliper is mounted to swing about an axis located at the optimum center of the arcuate movement of a friction pad, preferably the non-actuated pad, consequent on wear of the pads.

The optimum axis of swing is the axis which causes least radial movement during the wearing life of the friction pad of the path swept by the pad on the brake disc.

The movement of the pad as it wears is an arcuate movement, and the optimum center is in a plane perpendicular to the tangent at the intersection of the central plane of the disc with the arc through which the center of the contact area of the pad with the disc moves as the pads wear.

The optimum center may lie in the plane of the disc itself, or may be offset to one side of that plane.

Preferably, the caliper is mounted to swing on two part-spherical joints located on opposite sides of the axis of the disc, and substantially equidistant therefrom. The advantage of using part-spherical joints is that the caliper moves angularly about the effective or geometrical center of the joints which can be in the optimum center even where that lies in or close to the central plane of the disc while still allowing the joints themselves to be located inwardly from the periphery of the disc.

Two forms of disc brake in accordance with our invention are illustrated by way of example in the accompanying drawings in which:

FIGURE 1 is a side elevation of one form of brake with the disc in section;

FIGURE 2 is an end elevation of the brake shown in FIGURE 1;

FIGURE 3 is a section on the line 3—3 of FIGURE 2;

FIGURE 4 is a section of one of the spherical mountings of the caliper on the line 4—4 of FIGURE 2;

FIGURE 5 is a section of the means for applying mechanically the brake shown in FIGURES 1 to 4; and FIGURE 6 is a section of another form of brake in a vertical plane containing the axis of the disc.

In the brake illustrated in FIGURES 1 to 5, 10 is the brake disc which is secured by bolts 11 to a wheel or other rotatable part of a vehicle transmission (not shown). A minor part of the disc is straddled by a caliper 12 which is mounted to swing about an axis substantially at right angles to the axis of the disc.

Friction pads 13, 14 bonded to rigid backing plates 15, 16 are mounted in the caliper for engagement with opposite faces of the brake disc. For service braking the pad 13 is applied to the disc by a piston 17 working in an hydraulic cylinder 18 in one limb of the cylinder, and for parking or emergency braking it is applied by mechanical applying means located in a sealed capsule 19 between the piston 17 and the friction pad, the pad being applied by each actuating means through a plunger 21 engaging the backing plate 15. When the friction pad 13 is applied to the disc the reaction on the caliper rocks the caliper about its axis and the friction pad 14 is applied to the disc by an abutment on the second limb of the caliper bearing on the backing plate 16.

Both friction pads are slidably guided for movement towards and away from the disc by cranked tongues 22 on the inner ends of plates 23 detachably secured by bolts 24 to opposite ends of the bridge portion of the caliper. These tongues engage in notches formed in the inner edges of outwardly extending lugs 25 on each end of the backing plates. On removal of the plates 23 the friction pad assemblies can be slid out of the end of the caliper in a circumferential direction, as indicated in chain-dotted lines in FIGURE 2, and fresh assemblies can be inserted in the same way.

The limb of the caliper which houses the actuating means is extended inwardly to form two angularly spaced legs 26 and 27 terminating in lugs 28 located on opposite sides of the axis of the disc and preferably equidistant therefrom but not beyond (or below in FIG. 1) the axis from the caliper. Each lug on the side next the disc presents a concave part-spherical surface to a complementary convex boss 29 on a stationary torque-taking plate 31 as shown in section in FIGURE 4. The plate 31 is conveniently mounted on an axle housing (not shown) or other stationary part adjacent to the disc.

The co-operating surfaces of the lug 28 and the boss 29 are held in engagement by a bolt 32 passing through a clearance hole in the lug and through a hole of larger diameter in the boss, the bolt having a convex part-spherical head 33 engaging the concave reverse surface of the boss 29. A shoulder or step 34 of a length substantially equal to the thickness of the boss 29 is preferably formed on the bolt 32 adjacent to the head to prevent the joint from being locked by over-tightening of the nut 35 on the bolt.

The joint may be sealed by a rubber ring 36 received in an annular recess around the lug 28 and bearing on the adjacent surface of the boss 29 and by a resilient metal disc 37 fixed to the head of the bolt and bearing on the surface of the boss around the head.

The geometrical centers of the two spherical joints are located on the disc side of the joints and lie in a plane which is perpendicular to a tangent at the intersection of the central plane of the brake disc with the arc of movement of the center of the contact area of the friction pad 14 with the disc which moves in an arc about a line joining the geometrical centers of the two-spherical joints as the friction pads wear. This arrangement ensures that there is a minimum radial movement of the friction pads relative to the disc as the pads wear.

The mechanical application of the directly actuated friction pad 13 is conveniently effected by the means shown in FIGURE 5. A cable 39 coupled to a hand brake lever is brought in through a housing 41 secured to the caliper and the inner end of the cable is attached to a link 42 pivotally connected at 43 to a radially projecting arm 44 on a disc 45. The disc is angularly movable in the capsule 19 and applies the friction pad 13 to the disc in the known manner by means of angularly spaced balls 46 mounted in the disc and co-operating with ramps in a stationary plate and an axially movable member. The capsule 19 may also incorporate an automatic adjuster for compensating for wear of the friction pads.

The modification shown in FIGURE 6 is substantially the same in construction as the brake shown in FIGURES 1 to 5, and the same reference numerals have been applied to corresponding parts, but the joints are between the disc axis and the caliper as shown and the friction pads 47 and 48 in this case are of tapered thickness, the tapering being in such a direction that as the pads wear the angle between the backing plates and the plane of the disc becomes progressively less and the pads have a longer working life.

The two concave part-spherical surfaces on the caliper are parts of a rigid structure and can readily be machined with sufficient accuracy to ensure that the load applied to the joints by the torque on the caliper when the brake is applied is shared substantially equally between the two joints. Once the machine has been accurately set up, tool wear does not affect the accuracy provided that in the initial setting up the distance between the centers of the part-spherical surfaces on the caliper legs is equal to the spacing between the centers of the bosses on the torque plate.

An important advantage of my invention is that as the pads wear, there is a minimum radial displacement of the pads relative to the disc so that the radial width and position of the braking path on the disc are not appreciably changed.

My invention is applicable equally to a brake in which the caliper straddles a portion of the outer periphery of a brake disc mounted on and rotating with a shaft or the like and to a brake in which the caliper straddles the inner periphery of a ring extending inwardly from a wheel rim or bell housing.

I claim:

1. A disc brake comprising a rotatable disc, a caliper straddling a portion of the periphery of the disc, opposed friction pads mounted in the caliper for engagement with opposite faces of the disc, actuating means located in the caliper for applying one of said friction pads to the disc, and means for pivotally mounting the caliper on a stationary member comprising no more than two spaced part-spherical joints which lie within the perimeter of the disc and are located on opposite sides of the axis of the disc but not beyond said axis from said caliper, the geometrical centers of the joints lying in a plane perpendicular to a tangent at the intersection of the central plane of the disc with the arc through which the center of contact of a pad with the disc moves as the pads wear.

2. A disc brake comprising a rotatable disc, a caliper straddling a portion of the periphery of the disc, opposed friction pads mounted in the caliper for engagement with opposite faces of said disc, said friction pads being tapered in thickness in a radial direction, actuating means located in the caliper for applying one of said friction pads to said disc, and means for pivotally mounting the caliper on a stationary member comprising no more than two spaced part-spherical joints which lie within the periphery of the disc and are located on opposite sides of the axis of the disc but not beyond said axis from said caliper, the geometrical centers of the joints lying in a plane perpendicular to a tangent at the intersection of the central plane of the disc with the arc through which the center of contact of a pad with the disc moves as the pads wear.

3. A disc brake as in claim 1 wherein said part-spherical joints comprise part-spherical lugs on the ends of angularly spaced legs integral with one side of the caliper, cooperating part-spherical bosses on a stationary torque-taking plate adjacent to the brake disc, and means for holding the said lugs and bosses in engagement and permitting relative angular movement between them.

References Cited by the Examiner

UNITED STATES PATENTS

| | | | |
|---|---|---|---|
| 2,777,540 | 1/57 | Bachman | 188—73 |
| 2,820,530 | 1/58 | Chouings et al. | 188—73 |
| 2,835,350 | 5/58 | Butler | 188—73 |

FOREIGN PATENTS

| | | |
|---|---|---|
| 728,709 | 4/55 | Great Britain. |
| 785,367 | 10/57 | Great Britain. |
| 878,314 | 9/61 | Great Britain. |

ARTHUR L. LA POINT, *Primary Examiner.*

EUGENE G. BOTZ, *Examiner.*